United States Patent
Yamasaki

(10) Patent No.: US 8,077,491 B2
(45) Date of Patent: Dec. 13, 2011

(54) INVERTER CONTROLLER

(75) Inventor: Hisanori Yamasaki, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 255 days.

(21) Appl. No.: 12/596,534

(22) PCT Filed: Apr. 20, 2007

(86) PCT No.: PCT/JP2007/058625
§ 371 (c)(1),
(2), (4) Date: Oct. 19, 2009

(87) PCT Pub. No.: WO2008/136072
PCT Pub. Date: Nov. 13, 2008

(65) Prior Publication Data
US 2010/0110743 A1  May 6, 2010

(51) Int. Cl.
*H02M 7/5387* (2007.01)
*H02M 7/539* (2006.01)
(52) U.S. Cl. .................... 363/132; 363/98; 363/141
(58) Field of Classification Search ............. 363/97, 363/98, 131, 132, 141; 318/802, 807, 809, 318/811
See application file for complete search history.

(56) References Cited

U.S. PATENT DOCUMENTS

| | | | |
|---|---|---|---|
| 5,614,803 A * | 3/1997 | Morioka et al. | 318/801 |
| 7,102,327 B2 * | 9/2006 | Ho | 318/812 |
| 2004/0207360 A1 | 10/2004 | Matsushiro et al. | |

FOREIGN PATENT DOCUMENTS

| | | |
|---|---|---|
| JP | 1-227663 A | 9/1989 |
| JP | 03-103078 | 4/1991 |
| JP | 2001-352790 A | 12/2001 |
| JP | 2005-535277 A | 11/2005 |
| JP | 2006-230079 A | 8/2006 |
| JP | 2007-82355 A | 3/2007 |

OTHER PUBLICATIONS

Halász et al., "Voltage Spectra of Two-Phase PWM Techniques in Inverter Fed AC Drives" Industrial Electronics, 1998. Proceedings. ISIE '98. IEEE International Symposium on Pretoria, South Africa Jul. 7-10, 1998, New York, NY, USA, IEEE, US LNKD, vol. 1, pp. 202-207, XP010296004.

(Continued)

*Primary Examiner* — Gary L Laxton

(74) *Attorney, Agent, or Firm* — Buchanan Ingersoll & Rooney PC

(57) ABSTRACT

A PWM operation unit includes a modulation-mode selecting unit selecting a two-phase modulation mode signal and a carrier-wave-synchronous-mode select command, a modulation-wave generating unit generating a modulation wave in response to the two-phase modulation mode signal, a carrier-wave generating unit generating a carrier wave in response to the carrier-wave-synchronous-mode select command, and a comparing unit comparing the modulation wave with the carrier wave. In a two-phase modulation mode, the PWM operation unit controls the carrier-wave generating unit such that a carrier wave frequency is set to an integral multiple of a modulation wave frequency.

17 Claims, 15 Drawing Sheets

OTHER PUBLICATIONS

Iwaji et al., "A New PWM Method to Reduce Beat Phenomenon in Large Capacity Inverters with Low-Switching Frequency" Industry Applications Conference, 1997, Thirty-Second IAS Annual Meeting, IAS '97., Conference Record of the 1997 IEEE New Orleans, LA, USA Oct. 5-9, 1997, New York, NY, USA, IEEE, US LNKD, vol. 2, pp. 1512-1519, XP010248523.
Supplementary European Search Report dated Oct. 1, 2010, issued in the corresponding European Application No. 07742060.2-2207.
International Search Report for PCT/JP2007/058625 completed Jul. 12, 2007.
Written Opinion for PCT/JP2007/058625 completed Jul. 12, 2007.
"Semiconductor Power Converting Circuit", pp. 130, The Institute of Electrical Engineers of Japan, Mar. 31, 1987.
Partial English Translation of Office Action, Appln No. JP 2007-551406, Feb. 12, 2008.
"Basis and Application of AC Motor Variable Speed Drive", pp. 2-7, The Institute of Electrical Engineers of Japan, Jun. 10, 2003.
"Semiconductor Power Converter Circuit", The Institute of Electrical Engineers of Japan, 8th Edition, pp. 2-7 May 25, 1995.

* cited by examiner

FIG.6

|  | PERIOD (SEE FIG. 2) | $\alpha 2ph$ |
|---|---|---|
| (1) | PERIOD 1 (APPROXIMATELY 0°<θ≤60°) | $-1-\alpha_v'$ |
| (2) | PERIOD 2 (APPROXIMATELY 60°<θ≤120°) | $+1-\alpha_u'$ |
| (3) | PERIOD 3 (APPROXIMATELY 120°<θ≤180°) | $-1-\alpha_w'$ |
| (4) | PERIOD 4 (APPROXIMATELY 180°<θ≤240°) | $+1-\alpha_v'$ |
| (5) | PERIOD 5 (APPROXIMATELY 240°<θ≤300°) | $-1-\alpha_u'$ |
| (6) | PERIOD 6 (APPROXIMATELY 300°<θ≤360°) | $+1-\alpha_w'$ |

FIG.7

| CODE NO. | CARRIER WAVE MODE | RELATION BETWEEN CARRIER WAVE FREQUENCY fc AND MODULATED WAVE FREQUENCY finv |
|---|---|---|
| 0 | ASYNCHRONOUS MODE | CARRIER WAVE AND MODULATED WAVE ARE ASYNCHRONOUS |
| 1 | SYNCHRONOUS 21P MODE | k=fc/finv=21 |
| 2 | SYNCHRONOUS 18P MODE | k=fc/finv=18 |
| 3 | SYNCHRONOUS 15P MODE | k=fc/finv=15 |
| 4 | SYNCHRONOUS 12P MODE | k=fc/finv=12 |
| 5 | SYNCHRONOUS 9P MODE | k=fc/finv=9 |

INVERTER CONTROLLER

TECHNICAL FIELD

The present invention relates to an inverter controller that controls an inverter driving a three-phase AC system such as an electric motor.

BACKGROUND ART

In an inverter main circuit provided in an inverter, which is configured by a bridge-connected semiconductor device unit, a switching loss is generated in the semiconductor device unit due to a switching control by a Pulse Width Modulation (PWM). To prevent the semiconductor device from being breakdown by the heat resulting from the loss, a cooler such as a radiating fin or a fan is arranged in the inverter main circuit. In consideration of downsizing for enhancing the value of an inverter product, downsizing of the cooler is needed. However, to achieve the downsizing, decreasing of the switching loss is first required.

Examples of conventional control techniques for decreasing a switching loss include the following techniques.
(1) Decreasing a Carrier Wave Frequency (Switching Frequency)
(2) Improving a Modulation Technique The technique (1) has such problems that when the carrier wave frequency is lowered too far, modulation accuracy is degraded and a noise level becomes greater, and thus there is a limit to the decrease.

Meanwhile, examples of the technique (2) include two-phase modulation systems by Patent Document 1 and Nonpatent Literature 1 described below. The two-phase modulation system is characterized in that in a switching control of U, V, and W-phases, one of these phases is not switch-controlled but the remaining two phases only are switch-controlled to generate a required modulation wave.

Nonpatent Literature 1 shows an operation waveform of a line-to-line voltage control PWM system, which is one technique of the two-phase modulation systems (see FIG. 6.3.24 in Nonpatent Literature 1). The line-to-line voltage control PWM system utilizes a fact that, when a three-phase AC device is used as a load, there is flexibility in selection of a phase voltage if the line-to-line voltage can be maintained. There are various modulation waves generated by this system.

For example, FIG. 6.3.24 of Nonpatent Literature 1 depicts a modulation waveform generated by arranging a switching dwell period of a ⅓ cycle for each of U, V, and W-phases in turn while the remaining two phases are switch-controlled in the dwell period.

According to the modulation waveform shown in the Nonpatent Literature 1, the switching dwell period is arranged for each ⅓ cycle (every 120 degrees), and thus, when the same carrier wave condition is provided, the number of switchings can be decreased to approximately ⅔ as compared to the normal three-phase PWM system. That is, it is advantageous that the switching loss can be decreased to approximately ⅔, and thus downsizing of the cooler of the main circuit and downsizing of the whole apparatus can be achieved.

In the modulation waveform generated by the line-to-line voltage control PWM system, at a timing of each end of the switching dwell periods arranged for every 120 degrees, the phases in which the switching is dwelled are changed over. Accordingly, a discontinuous inflection point is generated in the modulation wave of each phase, and unnecessary switchings are increased. On the other hand, in the modulation waveform shown in Nonpatent Literature 1, a changeover of phases in which the switching is dwelled is performed with a minimum value or a maximum value of the carrier wave to inhibit an increase in the unnecessary switchings.

Meanwhile, there are various forms of the two-phase modulation, and Patent Document 1 shows an example of a modulation wave in which the switching dwell periods are arranged for every 60 degrees. As compared to the system in which the dwell periods are changed over for every 120 degrees, the system in which the dwell periods are changed over for every 60 degrees can generate a modulation wave having positive and negative symmetry, resulting in a better loss balance in upper and lower devices configuring the inverter main circuit and enabling to more easily design a cooler.

Patent Document 1: Japanese Patent Application Laid-open No. 2001-352790

Nonpatent Literature 1: Semiconductor power converting circuit (Editor and Publisher: The Institute of Electrical Engineers of Japan, Selling agency: Ohmsha), pp. 130

DISCLOSURE OF INVENTION

Problem to be Solved by the Invention

Contrary to the modulation waveform in which the switching dwell periods are arranged for every 60 degrees as shown in Patent Document 1, considered is the condition as shown in Nonpatent Literature 1, that is, the modulation waveform under the condition in which the changeover of phases in which the switching is dwelled is performed with a minimum or maximum value of the carrier wave. With the condition of the modulation wave cycle and the carrier wave cycle as shown in Nonpatent Literature 1, the changeover timing of the switching dwell periods is in a 60-degree interval, and the peak of the carrier wave and the switching dwell period can be synchronized, resulting in inhibition of an increase in the unnecessary switchings.

However, depending on a relation between the carrier wave cycle and the modulation wave cycle, there is a case that a dwell period unbalance is generated between the phases. For example, when the carrier wave cycle is sufficiently smaller than the modulation wave cycle, the unbalance is unnoticeable and the influence is small. However, when the frequency of the modulation wave is increased or when the carrier wave frequency is lowered to further decrease the switching loss, the dwell period unbalance and therefore a phase unbalance in the switching count become gradually noticeable. This leads to problems in that a possibility of impairing driving characteristics are increased such as occurrence of an unbalance in an inverter output in itself, resulting in occurrence of an unnecessary pulsation in a load current or an output torque.

The present invention has been achieved in view of the above problems, and an object of the invention is to provide an inverter controller that utilizes a two-phase modulation system, that is, an inverter controller capable of inhibiting an unbalance of the dwell periods in the changeover of phases in which the switching is dwelled.

Means for Solving Problem

To solve the above problems and to achieve the object, an inverter controller according to the present invention includes an inverter main circuit that supplies a power to a three-phase load and a PWM operation unit that outputs a switching command to the inverter main circuit. The PWM operation unit includes a modulation-mode selecting unit that selects an optimal two-phase modulation mode signal for a modulation and a carrier-wave-synchronous-mode select command based on information on a voltage command value for applying a voltage to the three-phase load, a modulation-wave generating unit that generates a modulation wave as a voltage command value to the inverter main circuit in response to the two-phase modulation mode signal, a carrier-wave generating unit that generates a carrier wave used as a reference for the switching command in response to the carrier-wave-synchronous-mode select command, and a comparing unit that compares the modulation wave and the carrier wave and determines a switching pattern based on a result of comparison. In a two-phase modulation mode in which switching of any one of three phases configuring the inverter main circuit is turned off, the PWM operation unit controls the carrier-wave generating unit such that a carrier wave frequency that is a frequency of the carrier wave is set to an integral multiple of a modulation wave frequency that is a frequency of the modulation wave.

Effect of the Invention

According to an inverter controller of the present invention, during an operation in the two-phase modulation mode in which switching of any one of three phases configuring the inverter main circuit is dwelled, a carrier wave frequency is set to an integral multiple of a modulation wave frequency. Thus, it is possible to provide an effect that an unbalance of dwell periods in a changeover of phases in which switching is dwelled can be inhibited.

BRIEF DESCRIPTION OF DRAWINGS

FIG. 6 depicts a selecting expression for a modulation wave addition signal (α2ph) used to calculate a modulation wave corresponding to a modulation phase angle when performing a two-phase modulation.

FIG. 7 is an example of a carrier-wave-synchronous-mode select command output from a modulation-mode selecting unit.

Figure 1:
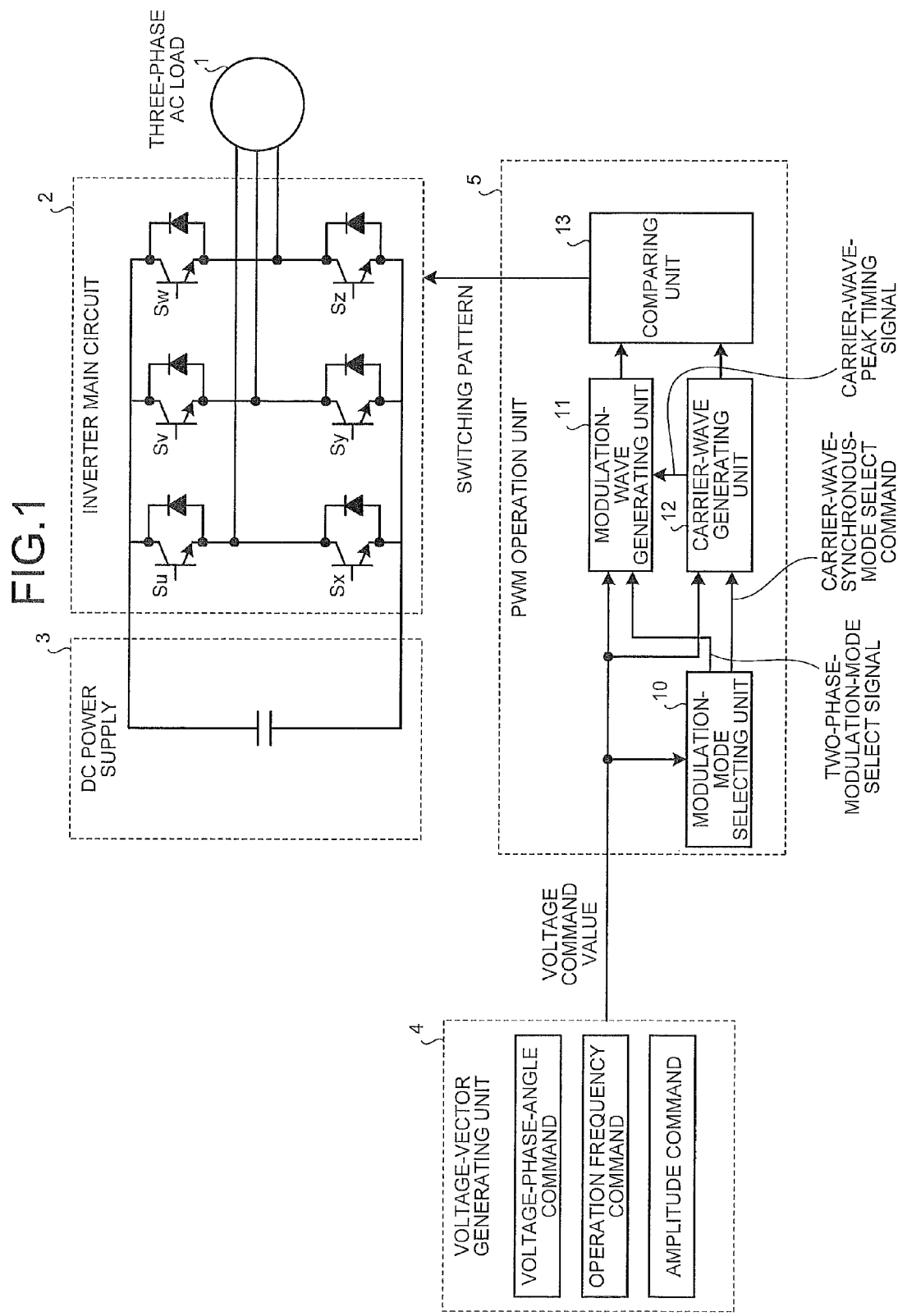
FIG. 1 depicts a configuration of an inverter controller according to a first embodiment of the present invention.

EXPLANATIONS OF LETTERS OR NUMERALS 1 three-phase AC load
2 inverter main circuit
3 DC power supply
4 voltage-vector generating unit
5 PWM operation unit
10, 10a modulation-mode selecting unit
11 modulation-wave generating unit
12 carrier-wave generating unit
13 comparing unit
15 modulation-factor generating unit
16 three-phase modulation-wave generating unit
17 modulation wave addition-signal generating unit
18 adder
19 three-phase-modulation changeover unit
21 carrier wave table
22 fc/finv selecting unit
23 adopted-time-proportion calculating unit
24 carrier-wave-frequency distributing unit
41 carrier-wave changeover-timing-signal output unit
42 carrier-wave phase-angle calculating unit
43 triangular-wave generating unit

BEST MODE(S) FOR CARRYING OUT THE INVENTION

Exemplary embodiments of an inverter controller according to the present invention will be explained in detail below with reference to the accompanying drawings. The present invention is not limited to the embodiments.

First Embodiment

FIG. 1 depicts a configuration of an inverter controller according to a first embodiment of the present invention, and shows an embodiment of the inverter controller that controls a three-phase AC load 1.

In FIG. 1, the inverter controller according to the first embodiment includes an inverter main circuit 2, a PWM operation unit 5 that generates a switching pattern used to control the inverter main circuit 2, and a voltage-vector generating unit 4 that generates a voltage command value to the PWM operation unit 5. The inverter main circuit 2 configures a bridge circuit in which juxtaposed pairs of switch units corresponding to three phases are connected, which are formed by connecting in series switch units (Su, Sy, Sw, Sx, Sy, and Sz) each realized by anti-parallel connection of a switching device and a diode, corresponding to two (upper and lower) circuits. A DC terminal of the inverter main circuit 2 is connected to a DC power supply 3 which is a battery or a capacitor, for example. An AC terminal thereof is connected to the three-phase AC load 1 which is a three-phase AC motor such as an induction motor or a synchronous motor, an input terminal of a power generation system, or the like. When being driven according to a switching command generated by the PWM operation unit 5, the inverter main circuit 2 converts a DC power supplied from the DC power supply 3 into a three-phase AC power of a variable amplitude and a variable frequency, and supplies the converted power to the three-phase AC load 1. When the configuration is applied to an electric vehicle, the three-phase AC load 1, the inverter main circuit 2, and the DC power supply 3 configure a drive unit of the electric vehicle, and the voltage-vector generating unit 4 and the PWM operation unit 5 configure a control unit of the electric vehicle.

Figure 2:
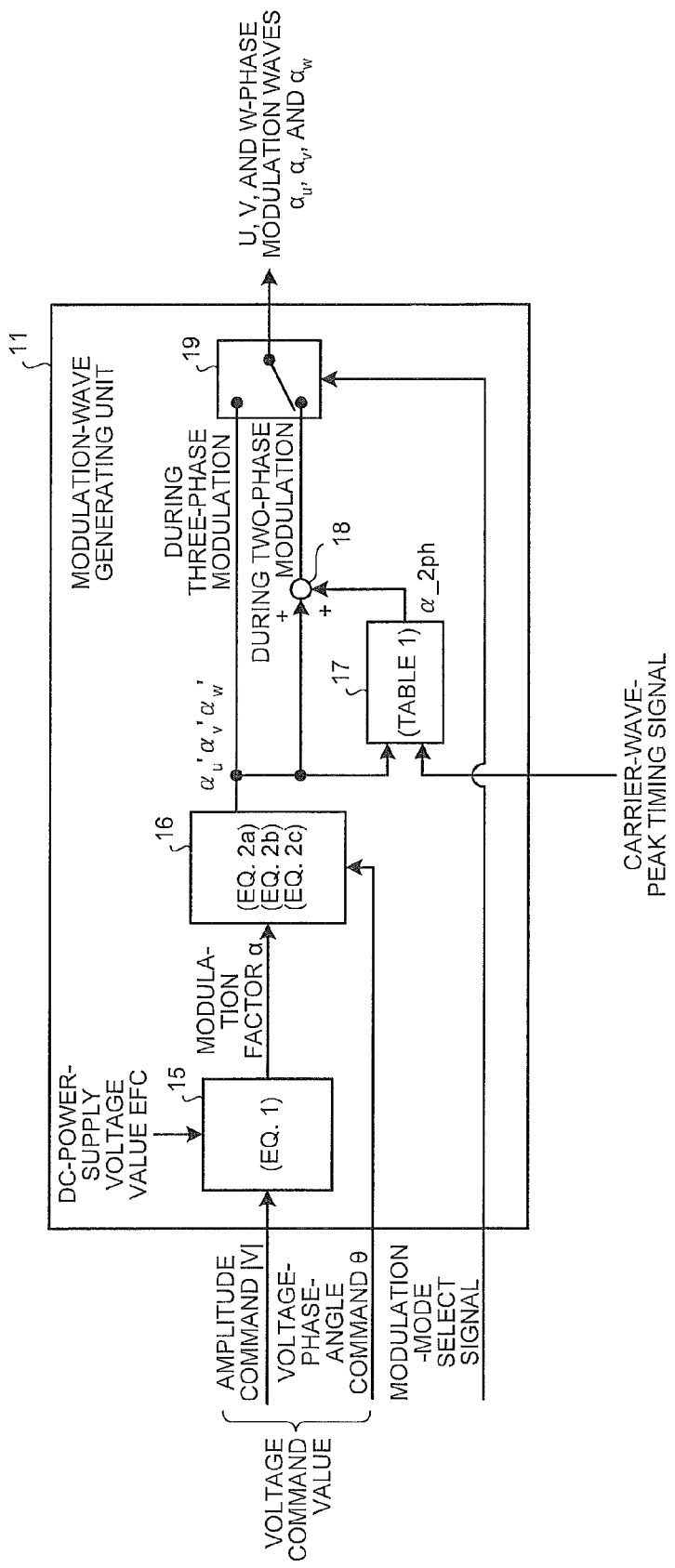
FIG. 2 depicts a configuration of a modulation-wave generating unit shown in FIG. 1.
Figure 3:
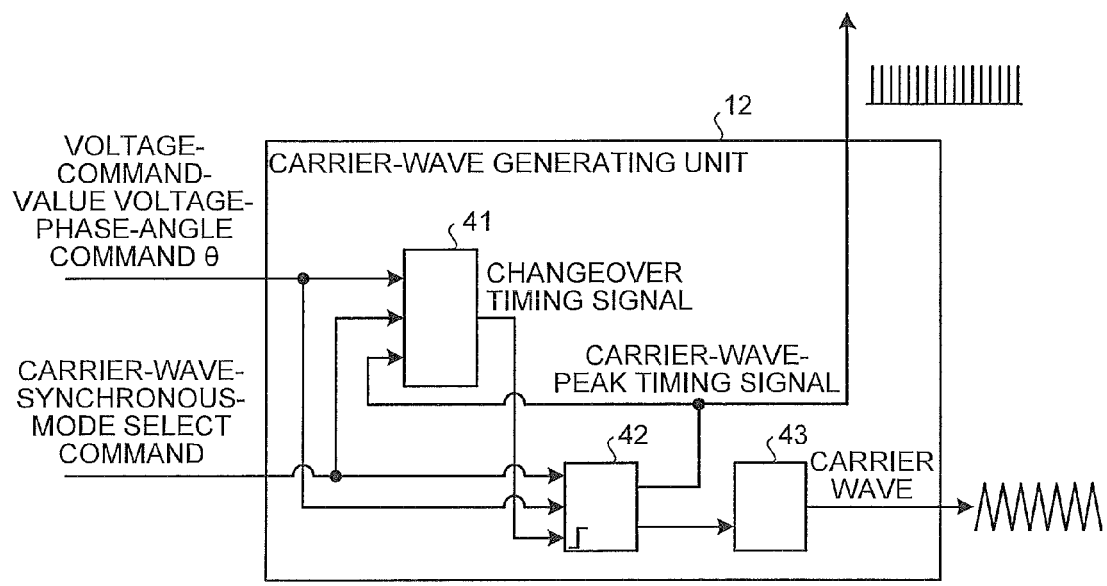
FIG. 3 depicts a configuration of a carrier-wave generating unit shown in FIG. 1.

Functions of the units configuring the inverter controller are described next. In FIG. 1, the inverter controller includes the voltage-vector generating unit 4 and the PWM operation unit 5, and the PWM operation unit 5 is configured to include a modulation-mode selecting unit 10, a modulation-wave generating unit 11, a carrier-wave generating unit 12, and a comparing unit 13. The voltage-vector generating unit 4 converts the voltage command value applied to the three-phase AC load 1 into forms such as a voltage-phase-angle command, a operation frequency command, and a voltage amplitude command, and outputs the commands to the PWM operation unit 5. The modulation-mode selecting unit 10 of the PWM operation unit 5 utilizes at least one of information about the voltage command value from the voltage-vector generating unit 4 to determine and select a two-phase-modulation-mode select signal and a carrier-wave-synchronous-mode select command that are optimal for modulation. Of the selected commands or signals, the modulation-mode selecting unit 10 outputs the two-phase-modulation-mode select signal to the modulation-wave generating unit 11 and outputs the carrier-wave-synchronous-mode select command to the carrier-wave generating unit 12. The carrier-wave generating unit 12 decides a frequency and a phase of the carrier wave according to the carrier-wave-synchronous-mode select command input from the modulation-mode selecting unit 10 and the voltage-phase-angle command input from the voltage-vector generating unit 4. The carrier-wave generating unit 12 generates a carrier wave as a triangular wave, for example, to be output to the comparing unit 13, and also generates a carrier-wave-peak timing signal needed for generating the modulation wave to be output to the modulation-wave generating unit 11. The modulation-wave generating unit 11 generates three phases of modulation waves based on the voltage command value from the voltage-vector generating unit 4, the output voltage value of the DC power supply 3, and the carrier-wave-peak timing signal from the carrier-wave generating unit 12, and outputs the generated modulation waves to the comparing unit 13. The comparing unit 13 compares the carrier wave input from the carrier-wave generating unit 12 and the modulation wave input from the modulation-wave generating unit 11 to determine a switching pattern according to the comparison result, and outputs the determined switching pattern to the inverter main circuit 2. The modulation-wave generating unit 11 and the carrier-wave generating unit 12 include various constituent components as detailed configurations, as shown in FIGS. 2 and 3, respectively. Functions of the constituent components are explained together with the following operation descriptions.

An operation of the inverter controller is described next with reference to FIGS. 2 to 14. An operation of the modulation-wave generating unit 11 is first described. The modulation-wave generating unit 11 generates three phases of modulation waves based on the voltage command value from the voltage-vector generating unit 4, the output voltage value of the DC power supply 3, and the carrier-wave-peak timing signal from the carrier-wave generating unit 12, as described above. This process is performed based on the following equation:

$$\alpha = |V|/(EFC/2) = 2 \cdot |V|/EFC \quad \text{(Equation 1)}$$

$$\alpha u' = \alpha \cdot \sin(\theta) \quad \text{(Equation 2a)}$$

$$\alpha v' = \alpha \cdot \sin(\theta - 2\pi/3) \quad \text{(Equation 2b)}$$

$$\alpha w' = \alpha \cdot \sin(\theta - 4\pi/3) \quad \text{(Equation 2c)}$$

When the two-phase modulation mode is selected by the modulation-mode selecting unit 10, a modulation wave according to the two-phase modulation is calculated. The following is an example in which the switching dwell periods are arranged for every 60 degrees, which is shown in Patent Document 1 or the like.

$$\alpha u = \alpha u' + \alpha 2ph \quad \text{(Equation 3a)}$$

$$\alpha v = \alpha v' + \alpha 2ph \quad \text{(Equation 3b)}$$

$$\alpha w = \alpha w' + \alpha 2ph \quad \text{(Equation 3c)}$$

On the other hand, when the two-phase modulation mode is not selected by the modulation-mode selecting unit 10, a normal modulation wave (hereinafter, "three-phase modulation wave") is output. Accordingly, the following selecting processes are performed.

$$\alpha u = \alpha u' \quad \text{(Equation 4a)}$$

$$\alpha v = \alpha v' \quad \text{(Equation 4b)}$$

$$\alpha w = \alpha w' \quad \text{(Equation 4c)}$$

Meanings of various symbols in Equations 1 to 4c are as follows:

$\alpha$: modulation index
$|V|$: voltage-amplitude command value
$\theta$: voltage-phase-angle command value
EFC: DC power supply voltage
$\alpha u'$, $\alpha v'$, $\alpha w'$: three-phase modulation wave
$\alpha u$, $\alpha v$, $=w$: two-phase modulation wave
$\alpha 2ph$: modulation wave addition signal The processes of Equations 1 to 4c are performed in the constituent components shown in FIG. 2. Specifically, a modulation-factor generating unit 15 performs the process of Equation 1, a three-phase modulation-wave generating unit 16 performs the processes of Equations 2a to 2c, and a modulation wave addition-signal generating unit 17, an adder 18 and a two-phase modulation/three-phase modulation changeover unit 19 perform the processes of Equations 3a to 3c and 4a to 4c, respectively.

Further, $\alpha 2ph$ is a function determined based on a phase angle of the modulation wave and an peak timing signal of the carrier wave output from the carrier-wave generating unit 12, as shown in FIG. 6. In FIG. 6, signals (1) to (6) selected as $\alpha 2ph$ are selected in the order of (1)→(2)→(3)→(4)→(5)→(5)→(6) when $\theta$ indicates a positively-increasing rotation direction, and selected in the order of (6)→(5)→(4)→(3)→(5)→(2)→(1) when $\theta$ indicates a negatively-decreasing reverse rotation direction. As a principle, each period corresponds to every 60 degrees of the modulation wave phase angle, and a timing to transit to the adjacent period is synchronized with the peak of the carrier wave generated in the carrier-wave generating unit 12.

A DC-power-supply voltage value EFC is usually almost constant and thus set as a fixed value in the modulation-wave generating unit 11 in the first embodiment. However, from the viewpoint of improving control accuracy in an output voltage of the inverter main circuit 2, a voltage sensor can be of course arranged in the DC power supply 3 to input a measurement result of the DC power supply voltage to the modulation-wave generating unit 11 to be used for EFC in Equation 1.

An operation of the carrier-wave generating unit 12 is described next by mainly with reference to FIG. 3. The carrier-wave generating unit 12 includes a carrier-wave changeover-timing-signal output unit 41, a carrier-wave phase-angle calculating unit 42, and a triangular-wave generating unit 43. The carrier-wave changeover-timing-signal output unit 41 generates a changeover timing signal described later, based on a carrier-wave-synchronous-mode select command input from the modulation-mode selecting unit 10 and a voltage-phase-angle command input from the voltage-vector generating unit 4, and outputs the generated signal to the carrier-wave phase-angle calculating unit 42. Based on the carrier-wave-synchronous-mode select command, the voltage-phase-angle command, and the changeover timing signal from the carrier-wave changeover-timing-signal output unit 41, the carrier-wave phase-angle calculating unit 42 feeds back a signal (carrier-wave-peak timing signal) indicating a timing at which the carrier wave peak is reached, to the carrier-wave changeover-timing-signal output unit 41, and also outputs the signal to the modulation-wave generating unit 11. The triangular-wave generating unit 43 generates a carrier wave of a triangular wave based on the information of the frequency and the phase angle of the carrier wave input from the carrier-wave phase-angle calculating unit 42, and outputs the triangular wave to the comparing unit 13.

The carrier-wave-synchronous-mode select command output from the modulation-mode selecting unit 10 is a signal specifying a relation between the carrier wave and the modulation wave, and complies with contents on a code table as shown in FIG. 7, for example. In descriptions below, a carrier wave frequency is abbreviated as fc and a modulation wave frequency is abbreviated as finv.

To consider a case that, a code No. 5 in FIG. 7 is input as the carrier-wave-synchronous-mode select command, for example. At this time, an arithmetic operation as indicated by the following equation is performed in the carrier-wave phase-angle calculating unit 42 to achieve a synchronous 9-pulse (9P) mode.

$$\theta c = k \cdot \theta - 90 [deg] \quad \text{(Equation 5a)}$$

where k=fc/finv=9.

Figure 4:
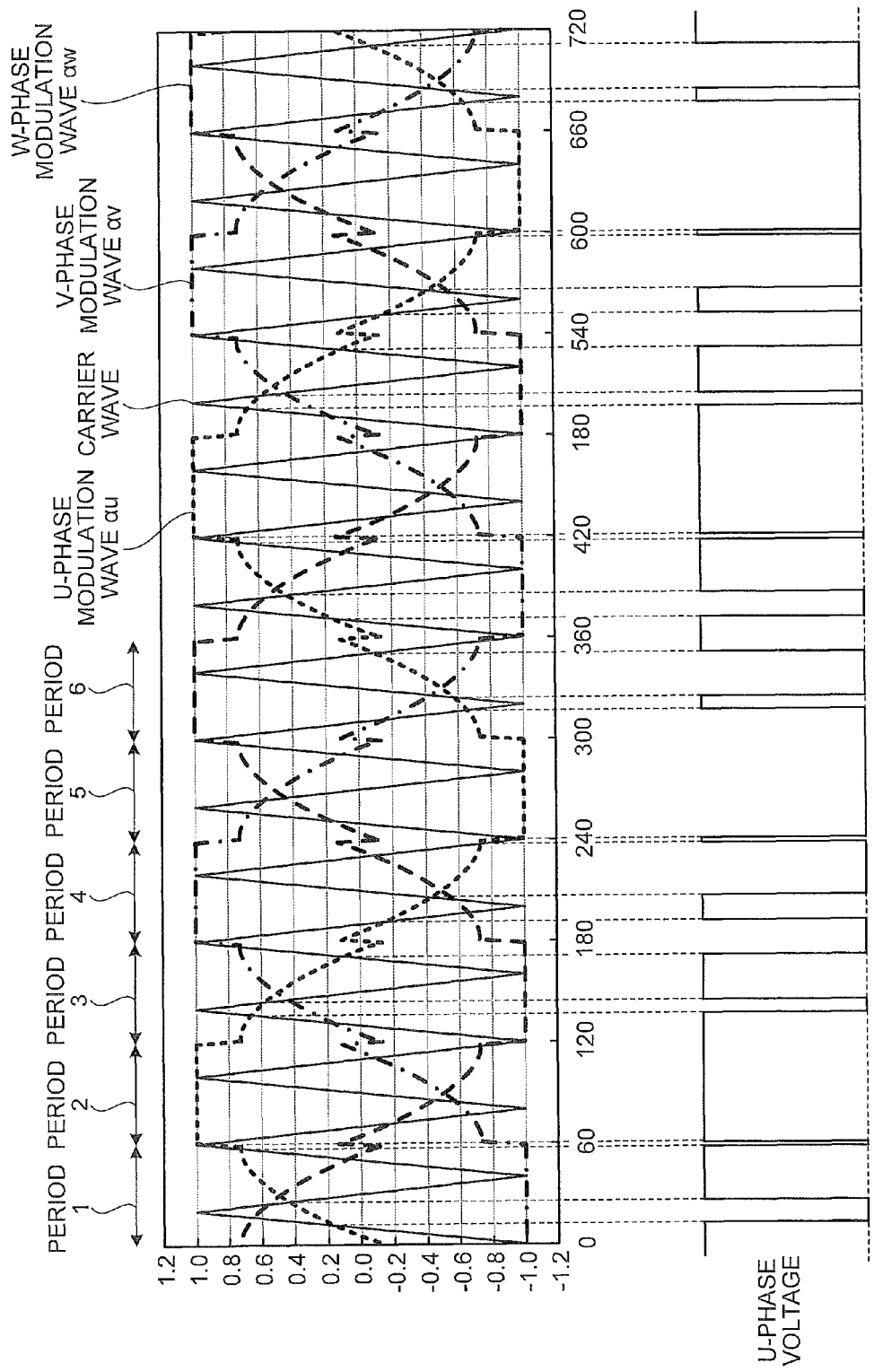
FIG. 4 is an example of a triangular wave in a synchronous 9-pulse mode generated by a triangular-wave generating unit.
Figure 8:
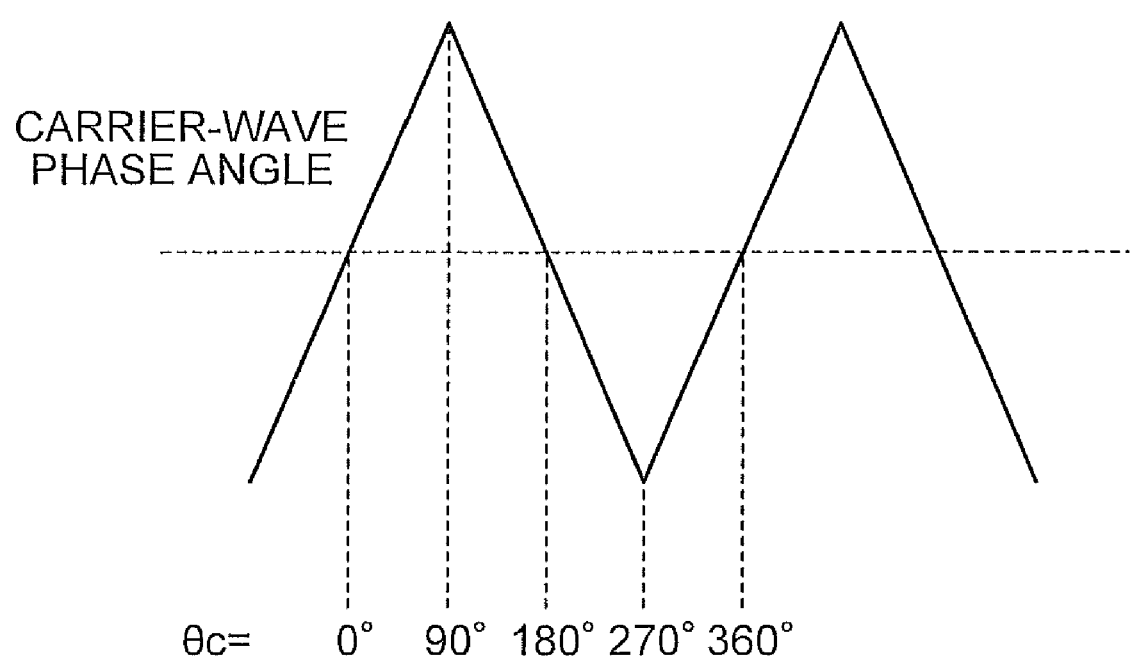
FIG. 8 depicts a relation between a carrier-wave waveform and a carrier-wave phase angle.

The triangular-wave generating unit 43 follows a carrier-wave phase angle $\theta c$ calculated based on Equation 5a to generate a desired carrier wave. FIG. 4 is an example of a triangular wave of the calculated synchronous 9-pulse mode, and FIG. 8 depicts a relation between the carrier-wave phase angle $\theta c$ and an actual carrier-wave waveform.

In FIG. 4, sections shown as periods 1 to 6 correspond to reference sections in FIG. 6 when selecting the modulation wave addition signal α2ph. For example, in the period 2 in FIG. 6, the modulation wave addition signal α2ph=+1−αu' is established. Thus, from Equation 3a, a U-phase modulation wave αu=αu'+α2ph=αu'+(1−αu')=1 is derived. This indicates that the switching signal is always on, resulting in the switch dwell period.

In FIG. 7, when the carrier-wave synchronous modes of the codes No. 1 to No. 6 are selected, a value of fc/finv shown in FIG. 7 is used as k in Equation 5a. Equation 5a shows a setting such that when $\theta$=0 degree, $\theta c$=−90 degrees is established. This phase difference setting is intended that the waveform changeover point in the two-phase modulation shown in FIG. 6 corresponds to the peak timing of the carrier wave. Accordingly, when the two-phase modulation is not used for example, another phase difference setting can be applied from the viewpoint of considering distribution of harmonic in the actual output voltage of the inverter main circuit, or the like.

On the other hand, when an asynchronous mode of the code No. 0 is selected in FIG. 7, the carrier wave phase angle can be calculated by the following equation, regarding that the carrier wave and the modulation wave are asynchronous.

$$\theta c = 360 \cdot fc \cdot t + \theta init [deg] \quad \text{(Equation 5b)}$$

where t denotes a time from when the asynchronous mode is selected, and $\theta init$ denotes an initially-set phase angle.

Figure 9:
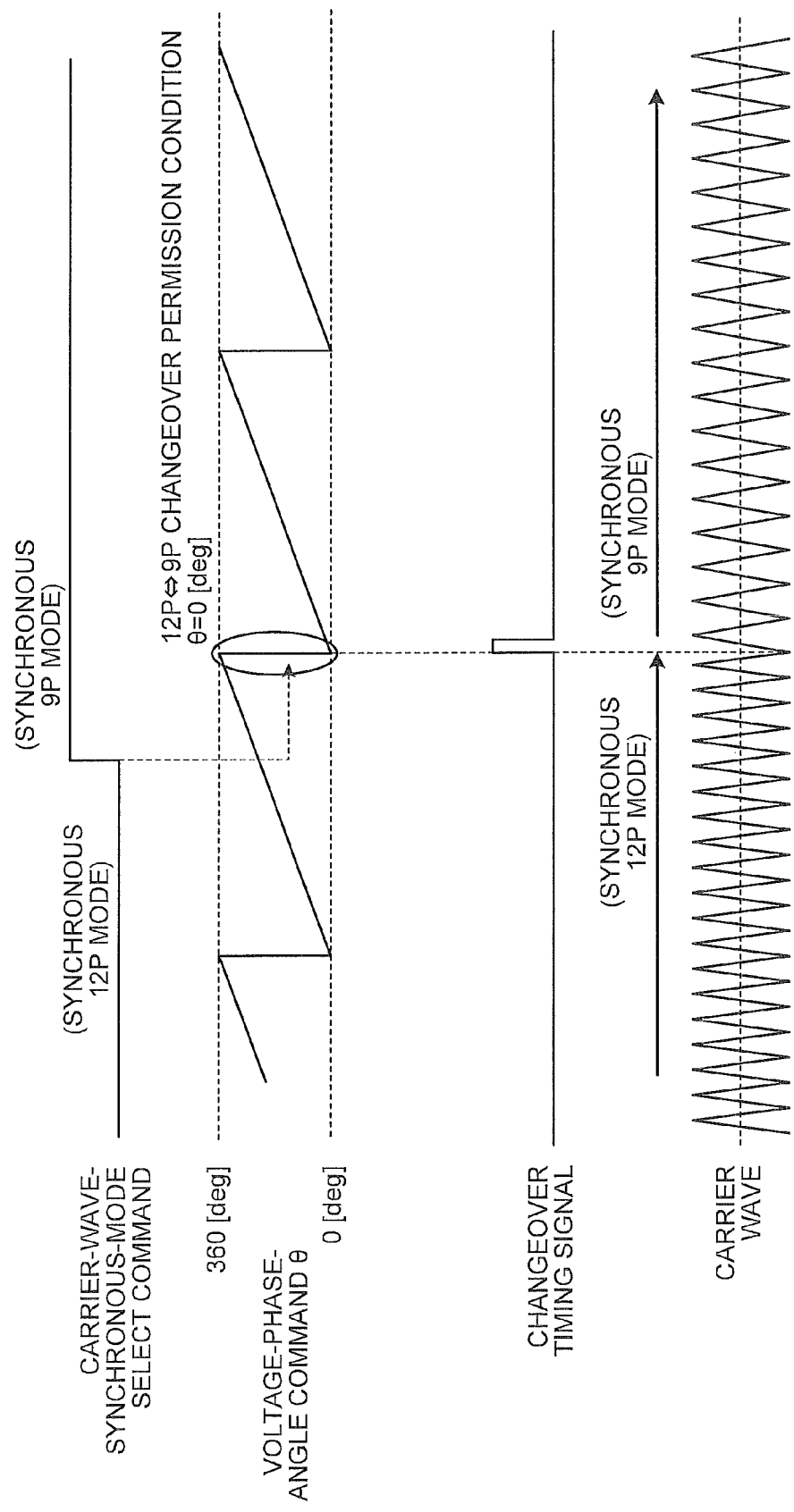
FIG. 9 is an example of a changeover process (synchronous 12P mode→synchronous 9P mode) in an arithmetic operation for calculating a carrier wave when the carrier-wave-synchronous-mode select command is changed.

A changeover process of an arithmetic operation for calculating a carrier wave when the carrier-wave-synchronous-mode select command is changed is described next with reference to FIG. 9.

To inhibit discontinuous generation of the PWM modulation, a timing at which the carrier wave is changed over basically needs to be set to a timing at which both the carrier waves before and after the changeover reaches the peaks so that discontinuous points of the carrier wave are eliminated as much as possible. For example, in the synchronous 9-pulse mode and the synchronous 12-pulse mode, a timing at which the respective peaks of the carrier waves coincide is when the voltage-phase-angle command $\theta$ is either 0 degree or 360 degrees. This timing is previously stored as a changeover permission condition in the carrier-wave changeover-timing-signal output unit 41. Changeover permission conditions between the respective modes of the codes No. 1 to No. 5 in FIG. 7 are similarly calculated in advance, and are stored in the carrier-wave changeover-timing-signal output unit 41.

When the carrier-wave-synchronous-mode select command is changed, the carrier-wave changeover-timing-signal output unit 41 outputs the changeover timing signal to the carrier-wave phase-angle calculating unit 42 at a timing at which $\theta$ satisfies the changeover permission condition while monitoring the voltage-phase-angle command $\theta$. The carrier-wave phase-angle calculating unit 42 continues the arithmetic operation without changing over the coefficient k in Equation 5a at a time point when the carrier-wave-synchronous-mode select command is changed, but changes over the coefficient k to a value corresponding to the carrier-wave-synchronous-mode select command at a time point when the changeover timing signal is input.

Figure 10:
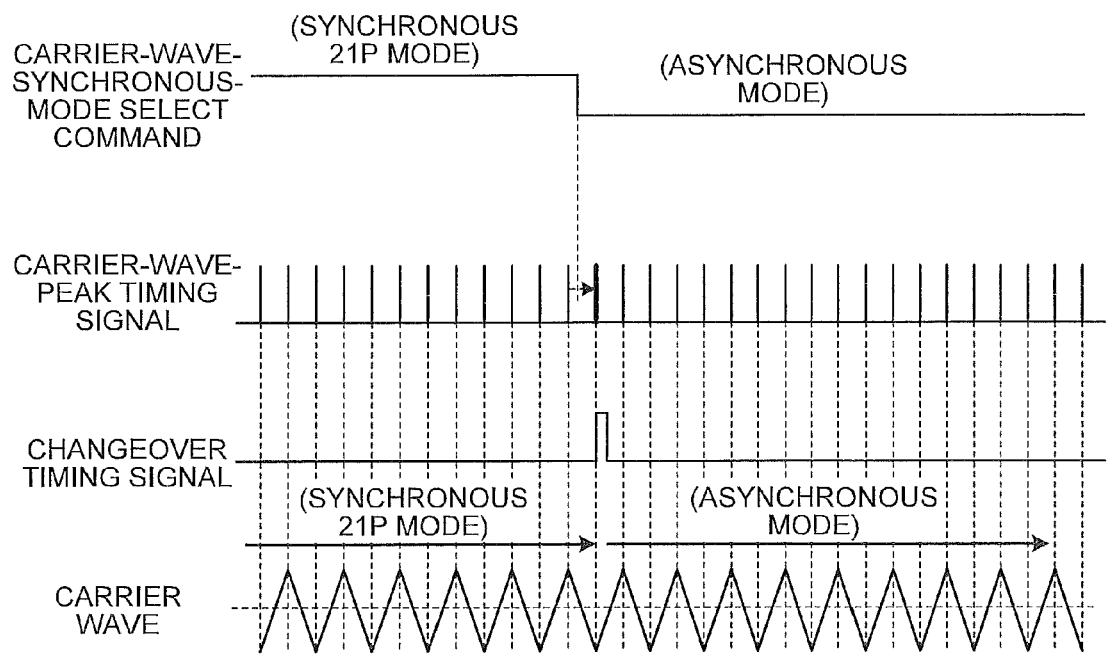
FIG. 10 is an example of a changeover process (synchronous 21P mode→asynchronous mode) in the arithmetic operation for calculating a carrier wave when the carrier-wave-synchronous-mode select command is changed.

On the other hand, the changeover process between the asynchronous mode and the synchronous mode differs from the process above described. A case that the carrier-wave-synchronous-mode select command is changed over from the synchronous mode to the asynchronous mode is first described with reference to FIG. 10. FIG. 10 is a schematic diagram for explaining a changeover process from the synchronous 21P mode to the asynchronous mode.

The carrier-wave changeover-timing-signal output unit 41 outputs the changeover timing signal at a time point when the carrier-wave-peak timing signal output by the carrier-wave phase-angle calculating unit 42 is input, and the carrier-wave phase-angle calculating unit 42 changes over from the arithmetic operation according to Equation 5a to the arithmetic operation in the asynchronous mode according to Equation 5b. As described above, to cause the peaks of the carrier waves to coincide, t at a time point when the changeover timing signal is input is set to 0, and $\theta init$ is set to −90[deg] when the carrier wave of the synchronous 21P mode is at a lower-limit peak and set to +90[deg] when it is at an upper-limit peak, during the generation of the carrier-wave-peak timing signal.

Figure 11:
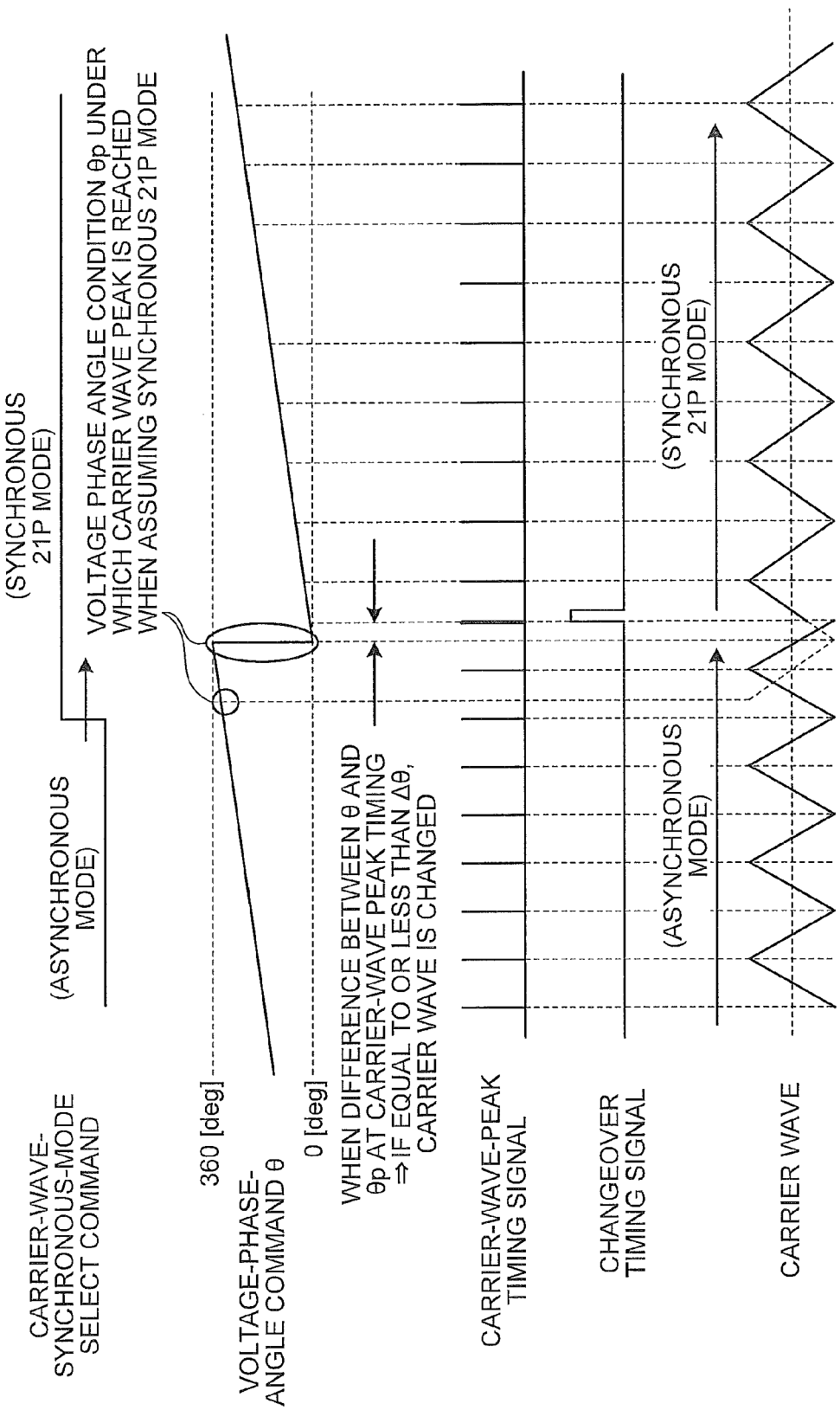
FIG. 11 is an example of a changeover process (asynchronous mode→synchronous 21P mode) in the arithmetic operation for calculating a carrier wave when the carrier-wave-synchronous-mode select command is changed.

A case that the carrier-wave-synchronous-mode select command is changed over from the asynchronous mode to the synchronous mode is described next with reference to FIG. 11. FIG. 11 is a schematic diagram for explaining a changeover process from the asynchronous mode to the synchronous 21P mode.

In this case, a state that the voltage-phase-angle command θ and the carrier-wave phase angle θc are not synchronized is transitioned to a state that the both are synchronized, and thus, when the carrier wave is changed over while the voltage-phase-angle command θ is a continuous signal, a discontinuous point is generated on the carrier wave side. To minimize influences of modulation error generation at the changeover, the carrier-wave changeover-timing-signal output unit 41 stores therein a voltage-phase-angle condition θp under which the carrier wave peak is reached when the synchronous pulse mode is assumed and a permission phase difference Δθ, and also outputs the changeover timing signal to the carrier-wave phase-angle calculating unit 42 at a timing at which following two conditions are both satisfied.

(a) a timing at which the carrier-wave-peak timing signal is input; and (b) a difference between the voltage-phase-angle commands θ and θp is equal to or less than Δθ.

For example, when Δθ is set large, the mode changeover condition is easily satisfied, and the changeover is promptly achieved. On the other hand, a range in which the carrier wave is discontinuous tends to become large, and a modulation error and a current shock of an inverter output that accordingly occurs easily occur. When Δθ is set small, various shocks caused by the discontinuity do not occur. Depending on the modulation wave frequency condition, however, the permission condition for the mode changeover is not easily satisfied and the changeover is delayed. These are in a trade-off relation, and thus are preferably adjusted and set according to practical implementation.

The modulation wave and carrier wave thus generated are output from the carrier-wave generating unit 12 to the comparing unit 13. The comparing unit 13 determines a switching pattern according to the comparison result between the modulation wave and the carrier wave, and outputs the determined switching pattern to the inverter main circuit 2.

Specifically, following patterns are provided:

(a) when αu>the carrier wave, Su (U-phase upper arm) is on, and Sx (U-phase lower arm) is off;

(b) when αu<the carrier wave, Su (U-phase upper arm) is off, and Sx (U-phase lower arm) is on;

(c) when αv>the carrier wave, Sv (V-phase upper arm) is on, and Sy (V-phase lower arm) is off;

(d) when αv<the carrier wave, Sv (V-phase upper arm) is off, and Sy (V-phase lower arm) is on;

(e) when αw>the carrier wave, Sw (W-phase upper arm) is on, and Sz (W-phase lower arm) is off; and (f) when αw<the carrier wave, Sw (W-phase upper arm) is off, and Sz (W-phase lower arm) is on.

In a lower portion in FIG. 4, one example of a U-phase voltage output of the inverter main circuit is shown. When the inverter main circuit 2 is driven by the switching pattern generated by the series of processes, the pulse width in the output voltage of each arm is controlled, and it becomes possible to cause a fundamental wave component of the voltage applied to the three-phase AC load 1 to follow the voltage command value output by the voltage-vector generating unit 4.

In the first embodiment, when the modulation-mode selecting unit 10 selects the two-phase modulation mode, and when the modulation wave frequency exceeds a predetermined value, the carrier wave is so set that the carrier wave frequency is an integral multiple of the modulation wave frequency. By this process, even under a driving condition under which the carrier wave cycle cannot be sufficiently reduced than the modulation wave cycle, a stable control is enabled without generating a modulation phase unbalance or an unnecessary power pulsation. Details thereof are described below.

Figure 12:
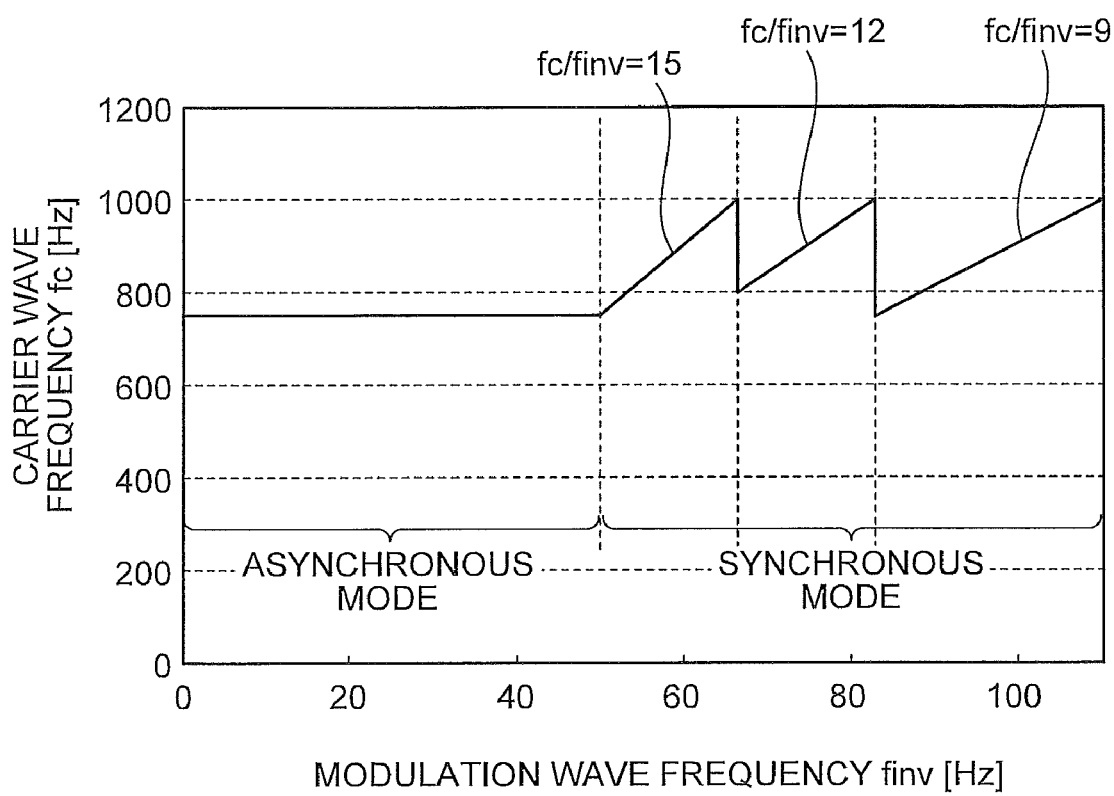
FIG. 12 is an example of setting of a carrier wave frequency according to the first embodiment.

FIG. 12 is an example of setting of the carrier wave frequency according to the first embodiment. The carrier-wave generating unit 12 is input the carrier-wave-synchronous-mode select command selected by the modulation-mode selecting unit 10 and the voltage command value (operation frequency command) from the voltage-vector generating unit 4, and sets a carrier wave frequency that follows an envelope in FIG. 12. In FIG. 12, when finv=50 Hz or less for example, the asynchronous mode is established, and fc=750 Hz is also set. That is, in this operating range, the carrier wave frequency and the modulation wave frequency are not necessarily in a relation of integral multiples.

Figure 13:
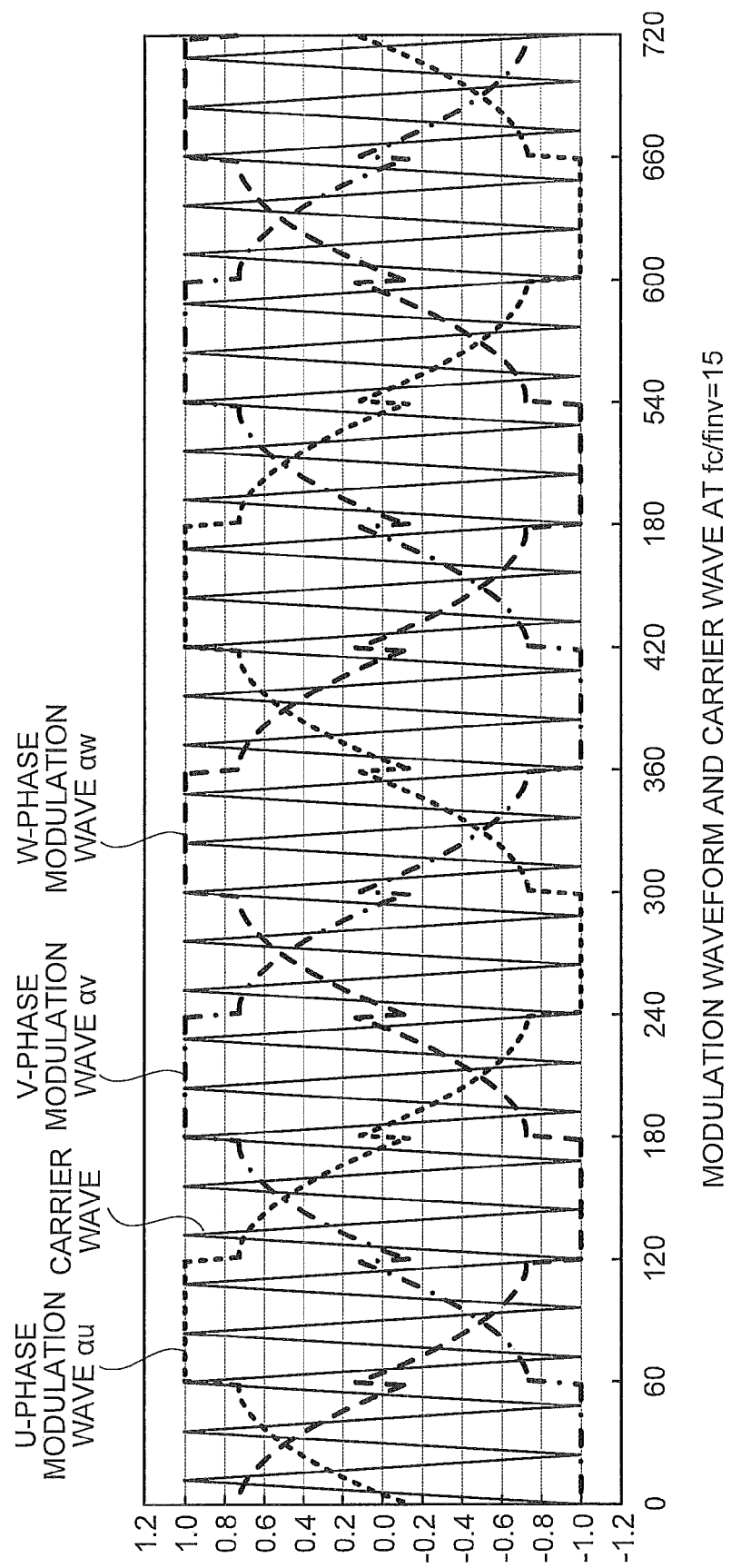
FIG. 13 is a waveform chart of a modulation wave and a carrier wave when fc/finv=15 (synchronous 15P mode) is established.
Figure 14:
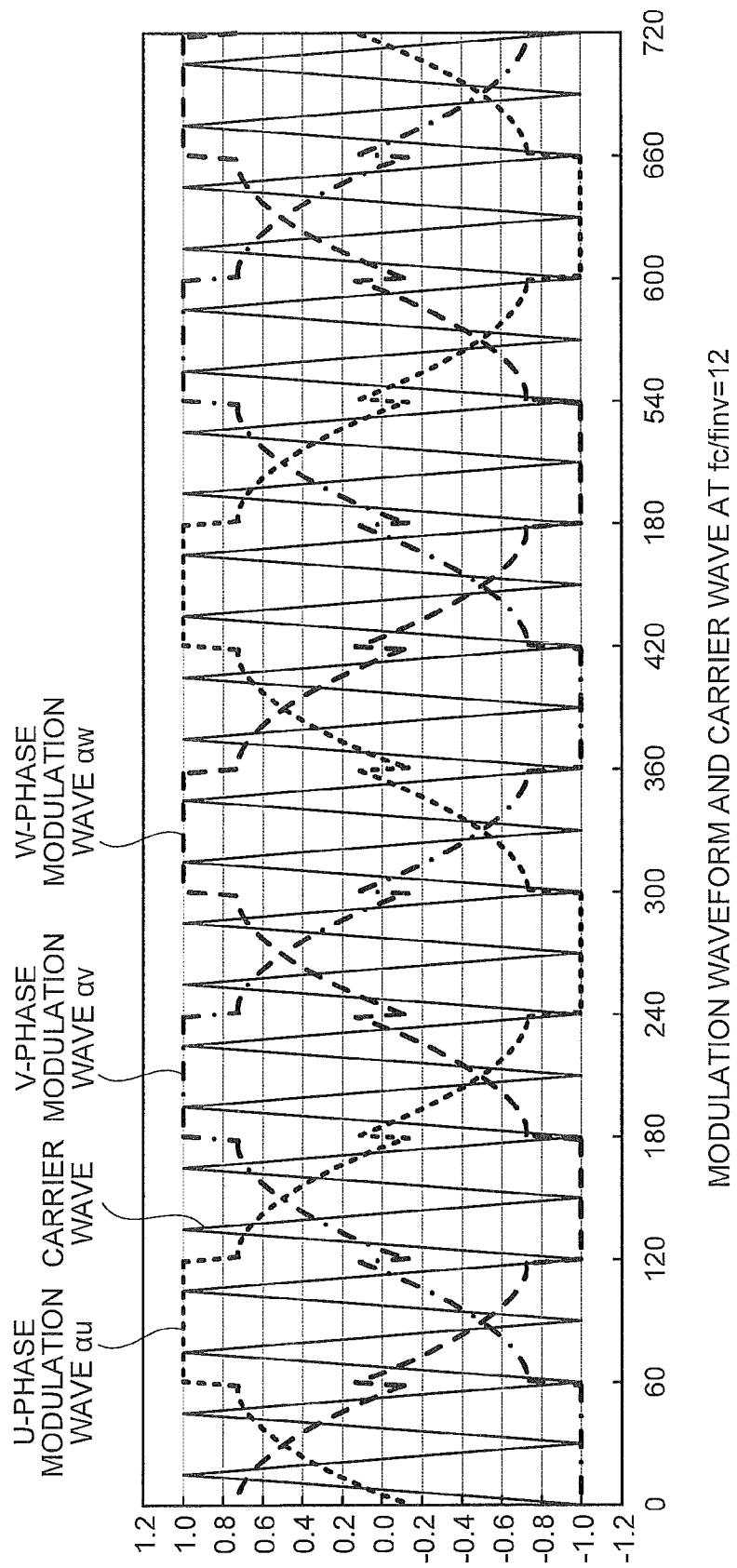
FIG. 14 is a waveform chart of a modulation wave and a carrier wave when fc/finv=12 (synchronous 12P mode) is established.

On the other hand, in an operating range where finv=50 Hz or more, the synchronous mode in which fc is synchronized with finv is employed, and fc is changed over according to finv to limit fc to equal to or less than 1000 Hz so that the switching loss does not exceed the cooling capacity of the main circuit. For example, FIG. 13 is a waveform chart of a modulation wave and a carrier wave when fc/finv=15 (synchronous 15P mode) and FIG. 14 is a waveform chart of a modulation wave and a carrier wave when fc/finv=12 (synchronous 12P mode). Similarly to the case shown in FIG. 4 (fc/finv=9: synchronous 9P mode), the synchronization between the carrier wave and the modulation wave is established, and the symmetry for every 60 degrees is maintained, and the switching count of each phase is uniform.

Figure 5:
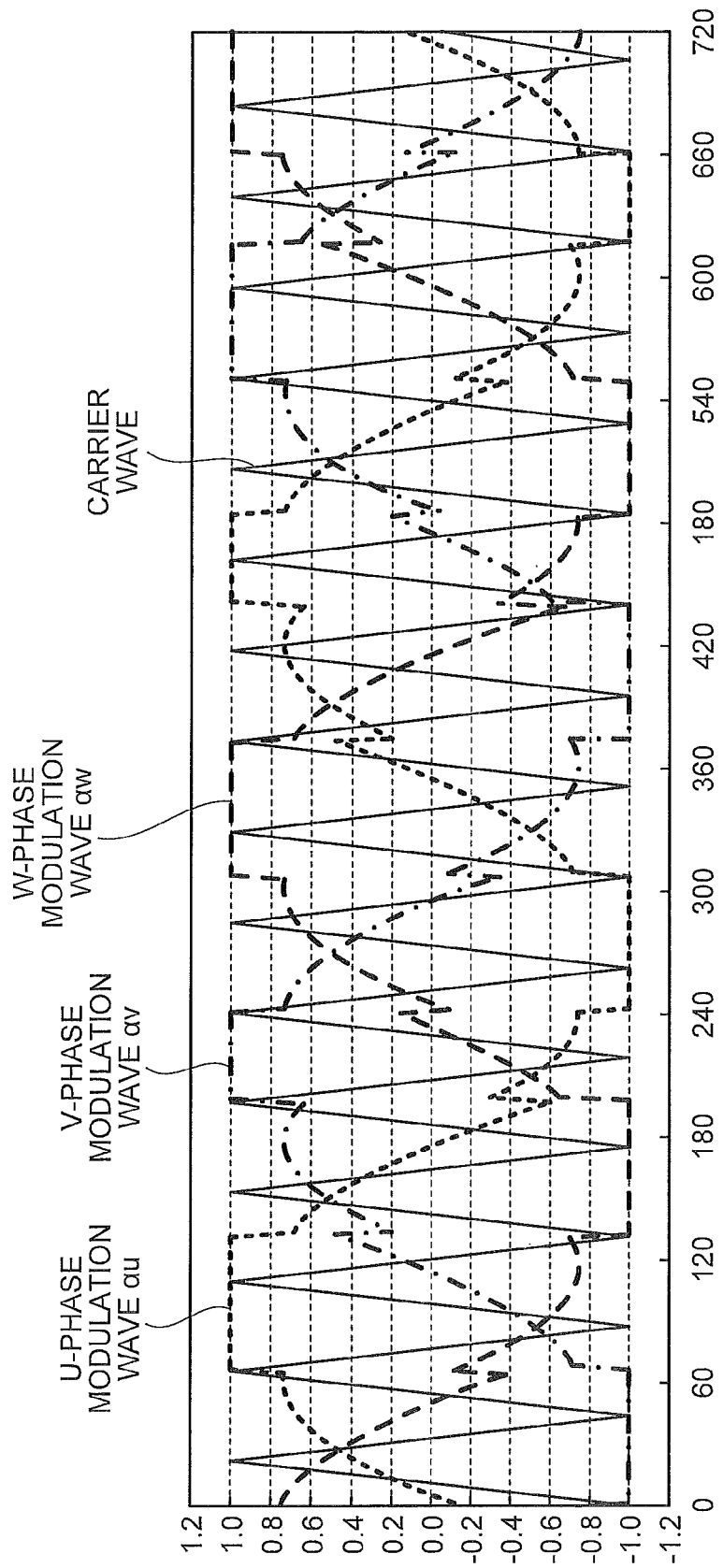
FIG. 5 is a waveform example of a two-phase modulation generated by employing a conventional technology.

Incidentally, FIG. 5 is a waveform example of the two-phase modulation generated by the conventional technology, in which a modulation wave and a carrier wave so conditioned that a changeover of phases in which the switching is dwelled is performed with a minimum or maximum value of the carrier wave wile the modulation waveform in which the switching dwell periods are arranged for every 60 degrees. In the conventional modulation waveform shown in FIG. 5, the phase unbalance in the switching dwell period is generated, and there is a concern that the driving characteristics are deteriorated due to a load current, a pulsation of an output torque, or the like.

On the other hand, in the waveform examples of the first embodiment shown in FIGS. 4, 13, and 14, the generation of the phase unbalance in the switching dwell period, which is seen in FIG. 5, is inhibited, and an unnecessary current pulsation of a load or a torque pulsation is inhibited, which enables to prevent the deterioration of the driving characteristics.

As described above, according to the inverter controller of the first embodiment, when the two-phase modulation mode is selected by the modulation-mode selecting unit, the carrier wave is so set that the carrier wave frequency is an integral multiple of the modulation wave frequency under a condition that the modulation frequency exceeds the predetermined value. Thereby, an effect can be provided that even under a driving condition under which the carrier wave cycle cannot be sufficiently reduced than the modulation wave cycle, the stable control can be achieve without generating a modulation phase unbalance or an unnecessary power pulsation.

Second Embodiment

In the first embodiment, when the modulation wave frequency exceeds the predetermined value, the carrier wave is so set that the carrier wave frequency is an integral multiple of the modulation wave frequency, and thereby, the generation of the modulation phase unbalance or the unnecessary power pulsation is inhibited. On the other hand, when this technique is employed, a changeover of discomfort sounds (mainly, magnetostriction sounds) generated from the inverter main circuit 2 or the three-phase AC load 1 at a changeover timing of the carrier wave frequency occurs, and thus there is a case that this technique is not desired for the use of an inverter in which low noises are regarded as important. In a second embodiment described below, an embodiment suitable for such an inverter in which the low noises are regarded as important is shown.

Figure 15:
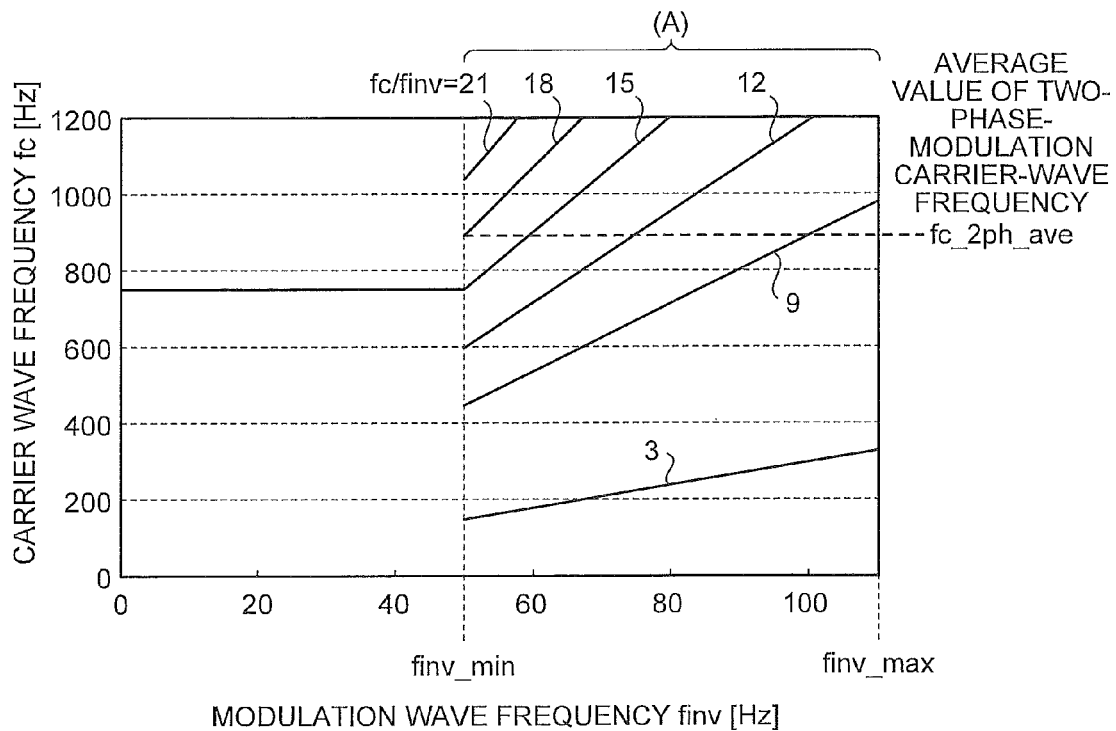
FIG. 15 is an example of setting of a carrier wave frequency according to a second embodiment of the present invention.

FIG. 15 is an example of setting of the carrier wave frequency according to the second embodiment. In FIG. 15, in a region (A) for example, the two-phase modulation mode is appropriately selected, and the carrier wave frequency fc is changed over as needed while maintaining the following conditions:

<Condition 1> fc/finv=an integral and a multiple of 3;
<Condition 2> a changeover time interval is equal to or longer than one cycle of the modulation wave;
<Condition 3> a changeover time interval is equal to or shorter than 0.1 seconds, for example;
<Condition 4> an average value (fc_2ph_ave) per a time Tco of the carrier wave frequency fc is equal to or less than a predetermined value (Tco: a time constant of the cooler of the main circuit); and
<Condition 5> when fc/finv=3, the modulation wave is restored to a normal modulation wave (three-phase modulation wave).

Figure 16:
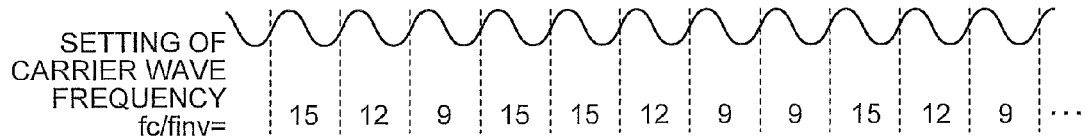
FIG. 16 is an example of a waveform when a carrier wave frequency is changed over.

FIG. 16 is an example in which the carrier wave frequency is changed over, and depicts a time distribution of a ratio (fc/finv) of setting values of the carrier wave frequency. When focusing on the modulation wave and the carrier wave per 1-cycle unit of the modulation wave, and when the conditions 1 and 2 are satisfied, the same effect as that in the first embodiment can be maintained, and thus the modulation phase unbalance can be inhibited. On the other hand, when the condition 3 is satisfied, the main circuit sound can be changed over in a time interval sufficiently shorter than human sensitivity, and thus a changeover sound sensed by human audibility or noises of the carrier wave itself can be decreased.

The condition 4 is for managing the main circuit loss not to exceed the cooling capacity of the cooler of the main circuit. For example, in order that the average value (fc_2ph_ave) of the carrier wave frequency fc is equal to or less than a predetermined value that is previously set, the changeover of the carrier wave frequency fc and the time distribution of each setting value of fc/finv are managed. In this way, the average value of the switching loss of the main circuit can be decreased to equal to or less than the predetermined value. For this purpose, fc_2ph_ave, which is the time average value, is suitably defined as a time average value per thermal time constant Tco of the main circuit. During the management of the changeover of the carrier wave frequency fc and the time distribution of each setting value of fc/finv, it is preferably noted that a period during which the main circuit loss is generated over the cooling capacity of the cooler in a transitional manner does not exceed the thermal time constant of the cooler.

Further, the condition 5 is a restriction for a case in which a period during which a smaller fc/finv is selected is generated when adopting a measure in which the carrier wave frequency fc is rendered equal to or less than fc_2ph_ave by the condition 4. Specifically, in a case of fc/finv=3, that is, a 3-pulse mode, the modulation wave is that of the normal three-phase modulation (see Equations 2a to 2c). The reason for this is that as shown in FIGS. 4 and 6 in the first embodiment, the modulation waveform of the general two-phase modulation is changed over in 60-degree units, and thus at least fc/finv>6 needs to be established for a successful operation. The 3-pulse mode has a sufficiently small switching count in the first place, and thus it can be normally considered that there is no case that the main circuit loss is increased more than that in the two-phase modulation when fc/finv=9, or the like, if current conditions of the three-phase load are the same.

Figure 17:
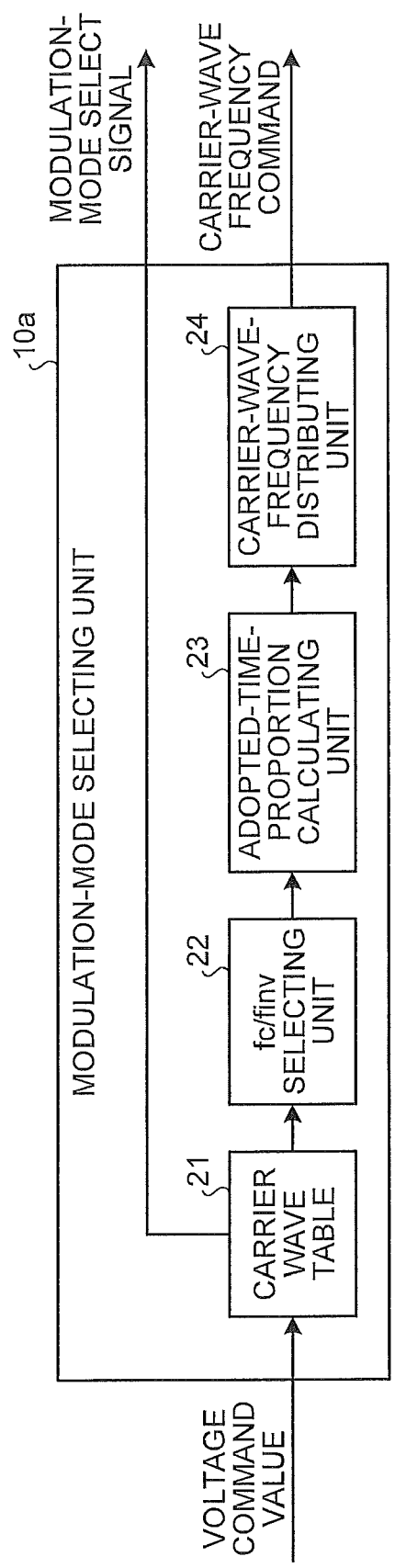
FIG. 17 is a configuration example of a modulation-mode selecting unit according to the second embodiment.

FIG. 17 is a configuration example of a modulation-mode selecting unit 10a, to enable driving while maintaining the conditions 1 to 5. In FIG. 17, based on at least one of the frequency of the voltage command value and the modulation index, the modulation-mode selecting unit 10a outputs to the modulation-wave generating unit 11a modulation-mode select signal to instruct to select either the normal modulation or the two-phase modulation.

On a carrier wave table 21, the relation between the modulation wave frequency finv and the carrier wave frequency fc as described above, which is shown in FIG. 15, is previously set, and a operation frequency minimum value (finv_min), a operation frequency maximum value (finv_max), and a carrier-wave-frequency average value (fc_2ph_ave) in the two-phase modulation are also set. The operation frequency minimum value finv_min and the operation frequency maximum value finv_max denote a lower limit value and an upper limit value of the modulation wave frequency in the operating range to which the two-phase modulation as shown in FIG. 15 is applied, respectively, and the carrier-wave-frequency average value fc_2pf_ave is described above.

The modulation-mode selecting unit 10a outputs a two-phase modulation mode command as the modulation-mode select signal to the modulation-wave generating unit 11, when the frequency of the voltage command value input from the voltage-vector generating unit 4 is between finv_min and finv_max. The modulation-wave generating unit 11 performs the arithmetic operation of the modulation wave based on Equations 2a to 2c and 3a to 3c. However, when a 3-pulse mode frequency is output as the carrier-wave frequency command below, the normal modulation mode command is output as the modulation-mode select signal. The equations employed at that time are Equations 2a to 2c and 4a to 4c.

On the other hand, the carrier-wave frequency command output to the carrier-wave generating unit 12 is output via an fc/finv selecting unit 22, an adopted-time-proportion calculating unit 23, and a carrier-wave-frequency distributing unit 24, as shown in the following procedures (1) to (3).

(1) The fc/finv selecting unit 22 selects from the ratio between the two-phase-modulation carrier-wave average value fc_2ph_ave and the modulation wave frequency finv, two or more candidates of a ratio between fc and finv, which are actually selected and output. The ratio fc/finv is a multiple of 3 as set forth in the condition 1, similarly to the first embodiment, and three multiples close in value to fc_2ph_ave/finv are selected as a, b, and c in decreasing order of size. For example, when fc_2ph_ave=900 [Hz] and finv=55 [Hz], fc_2ph_ave/finv=16.36, and thus the selection is performed as (a, b, c)=(18, 15, 12).

(2) While appropriately changing over (a, b, c), the adopted-time-proportion calculating unit 23 determines adopted time proportions Xa, Xb, and Xc of a, b, and c according to the following equations so that the average of the carrier wave frequency fc is fc__2ph_ave as set forth in the condition 4:

$$Xb=0.3 \quad \text{(Equation 6a)}$$

$$Xa=[(\text{fc}\_\text{2ph}\_\text{ave}/\text{finv})-Xb\cdot(b-c)-c]/(a-c) \quad \text{(Equation 6b)}$$

$$Xc=1-Xa-Xb \quad \text{(Equation 6c)}$$

Equations 6a to 6c are derived from the following assumptions, that is, Equations 7a and 7b.

First, Xa, Xb, and Xc are the adopted-time proportions, and thus a sum total is one. This results in:

$$Xa+Xb+Xc=1 \quad \text{(Equation 7a)}.$$

Further, when a, b, and c are selected as fc/finv based on the adopted time proportions Xa, Xb, and Xc, so that the average value of fc is fc__2ph_ave, the following equation is established:

$$a\cdot\text{finv}\cdot Xa+b\cdot\text{finv}\cdot Xb+c\cdot\text{finv}\cdot Xc=\text{fc}\_\text{2ph}\_\text{ave} \quad \text{(Equation 7b)}.$$

There is another point of freedom other than Equation 7a and 7b to determine the adopted time proportions Xa, Xb, and Xc, and thus the adopted proportion Xb of b that is closest to fc__2ph_ave/finv can be designated as 30%, for example, as in Equation 6a. In this way, Xa and Xc also can be determined. The arithmetic operations are carried out at predetermined time (about several seconds, for example) intervals, and the result is updated and output to the carrier-wave-frequency distributing unit 24.

(3) Three setting values of fc/finv are distributed and set based on the adopted-time proportions Xa, Xb, and Xc. Specifically, it is set so that the same fc/finv are not placed adjacent to each other wherever possible to satisfy the condition 3 and the carrier wave setting is changed over per 1-cycle unit of the modulation wave to satisfy the condition 2, and the carrier frequency command that conforms to this setting is output to the carrier-wave generating unit 12. FIG. 16 is an example where Xa:Xb:Xc=4:3:4 is set when the selection is performed as (a, b, c)=(15, 12, 9).

As described above, according to the inverter controller of the second embodiment, when the modulation-mode selecting unit selects the two-phase modulation mode, the carrier wave is so set that the carrier wave frequency is an integral multiple of the modulation wave frequency. Thus, even under a driving condition under which the carrier wave cycle cannot be sufficiently reduced than the modulation wave cycle, it is possible to obtain an effect in which the stable control can be achieved without generating a modulation phase unbalance or an unnecessary power pulsation. Moreover, it is possible to contribute to reduction in noises because changeover sounds of discomfort sounds (mainly, magnetostriction sounds) generated from the inverter main circuit 2 or the three-phase AC load 1 at a timing when the changeover of the carrier wave frequency is generated is inhibited.

INDUSTRIAL APPLICABILITY

As described above, the inverter controller according to the present invention is useful as an invention that enables to inhibit a dwell period unbalance in the changeover of phases in which switching is dwelled.

The invention claimed is:

1. An inverter controller comprising:
    an inverter main circuit that supplies a power to a three-phase load; and
    a pulse-width-modulation operation unit that outputs a switching command to the inverter main circuit, wherein
    the pulse-width-modulation operation unit includes
        a modulation-mode selecting unit that selects an optimal two-phase modulation mode signal for modulation and a carrier-wave-synchronous-mode select command based on information on a voltage command value for applying a voltage to the three-phase load,
        a modulation-wave generating unit that generates a modulation wave as a voltage command value to the inverter main circuit in response to the two-phase modulation mode signal,
        a carrier-wave generating unit that generates a carrier wave that becomes a reference for the switching command in response to the carrier-wave-synchronous-mode select command, and
        a comparing unit that compares the modulation wave and the carrier wave and determines a switching pattern based on a result of comparison, and
    in a two-phase modulation mode in which switching of any one of three phases configuring the inverter main circuit is turned off, the pulse-width-modulation operation unit controls the carrier-wave generating unit such that a carrier wave frequency that is a frequency of the carrier wave is set to an integral multiple of a modulation wave frequency that is a frequency of the modulation wave.

2. The inverter controller according to claim 1, wherein the carrier-wave generating unit performs a switching of a carrier-wave synchronous mode based on the information on the voltage command value and the carrier-wave-synchronous-mode select command, and outputs a carrier-wave-peak timing signal to the modulation-wave generating unit.

3. The inverter controller according to claim 2, wherein the modulation-wave generating unit generates three phases of modulation waves based on the information on the voltage command value and the carrier-wave-peak timing signal, and outputs the modulation waves to the comparing unit.

4. The inverter controller according to claim 1, wherein in the two-phase modulation mode, the pulse-width-modulation operation unit sets the carrier wave frequency to the integral multiple of the modulation wave frequency when a condition is satisfied in which the modulation wave frequency exceeds a preset value.

5. The inverter controller according to claim 1, wherein
    the inverter main circuit includes
        a semiconductor device as a switching device, and
        a cooling unit that cools down the semiconductor device, and
    the pulse-width-modulation operation unit sets the carrier wave frequency such that a time average of the carrier wave frequency per a time constant of the cooling unit does not exceed an upper limit of the carrier wave frequency that is determined from a cooling capacity of the cooling unit.

6. The inverter controller according to claim 2, wherein
    the inverter main circuit includes
        a semiconductor device as a switching device, and
        a cooling unit that cools down the semiconductor device, and
    the pulse-width-modulation operation unit sets the carrier wave frequency such that a time average of the carrier wave frequency per a time constant of the cooling unit does not exceed an upper limit of the carrier wave frequency that is determined from a cooling capacity of the cooling unit.

7. The inverter controller according to claim 3, wherein
    the inverter main circuit includes
        a semiconductor device as a switching device, and
        a cooling unit that cools down the semiconductor device, and
    the pulse-width-modulation operation unit sets the carrier wave frequency such that a time average of the carrier wave frequency per a time constant of the cooling unit does not exceed an upper limit of the carrier wave frequency that is determined from a cooling capacity of the cooling unit.

8. The inverter controller according to claim 4, wherein the inverter main circuit includes
a semiconductor device as a switching device, and
a cooling unit that cools down the semiconductor device, and
the pulse-width-modulation operation unit sets the carrier wave frequency such that a time average of the carrier wave frequency per a time constant of the cooling unit does not exceed an upper limit of the carrier wave frequency that is determined from a cooling capacity of the cooling unit.

9. The inverter controller according to claim 1, wherein the pulse-width-modulation operation unit changes over a ratio of the carrier wave frequency to the modulation wave frequency by time of one cycle of the modulation wave while maintaining a condition that the carrier wave frequency is the integral multiple of the modulation wave frequency.

10. The inverter controller according to claim 2, wherein the pulse-width-modulation operation unit changes over a ratio of the carrier wave frequency to the modulation wave frequency by time of one cycle of the modulation wave while maintaining a condition that the carrier wave frequency is the integral multiple of the modulation wave frequency.

11. The inverter controller according to claim 3, wherein the pulse-width-modulation operation unit changes over a ratio of the carrier wave frequency to the modulation wave frequency by time of one cycle of the modulation wave while maintaining a condition that the carrier wave frequency is the integral multiple of the modulation wave frequency.

12. The inverter controller according to claim 4, wherein the pulse-width-modulation operation unit changes over a ratio of the carrier wave frequency to the modulation wave frequency by time of one cycle of the modulation wave while maintaining a condition that the carrier wave frequency is the integral multiple of the modulation wave frequency.

13. The inverter controller according to claim 9, wherein in the two-phase modulation mode, the pulse-width-modulation operation unit switches to a three-phase modulation mode when the ratio of the carrier wave frequency to the modulation wave frequency reaches three.

14. The inverter controller according to claim 10, wherein in the two-phase modulation mode, the pulse-width-modulation operation unit switches to a three-phase modulation mode when the ratio of the carrier wave frequency to the modulation wave frequency reaches three.

15. The inverter controller according to claim 11, wherein in the two-phase modulation mode, the pulse-width-modulation operation unit switches to a three-phase modulation mode when the ratio of the carrier wave frequency to the modulation wave frequency reaches three.

16. The inverter controller according to claim 12, wherein in the two-phase modulation mode, the pulse-width-modulation operation unit switches to a three-phase modulation mode when the ratio of the carrier wave frequency to the modulation wave frequency reaches three.

17. An inverter controller comprising:
an inverter main circuit that supplies a power to a three-phase load; and
a pulse-width-modulation operation unit that outputs a switching command to the inverter main circuit, wherein
the pulse-width-modulation operation unit includes
a modulation-wave generating unit that generates a modulation wave as a voltage command value to the inverter main circuit,
a carrier-wave generating unit that generates a carrier wave that becomes a reference for the switching command, and
a comparing unit that compares the modulation wave and the carrier wave and determines a switching pattern based on a result of comparison, and
in a two-phase modulation mode in which switching of any one of three phases configuring the inverter main circuit is turned off, the pulse-width-modulation operation unit controls the carrier-wave generating unit such that a carrier wave frequency that is a frequency of the carrier wave is set to an integral multiple of a modulation wave frequency that is a frequency of the modulation wave, and changes over a ratio of the carrier wave frequency to the modulation wave frequency by time of one cycle of the modulation wave while maintaining a condition that the carrier wave frequency is an integral multiple of the modulation wave frequency.

* * * * *